United States Patent
Yang et al.

(10) Patent No.: US 7,764,702 B2
(45) Date of Patent: Jul. 27, 2010

(54) METHOD AND APPARATUS FOR CUSTOMER-CONTROLLED ROUTING MANAGEMENT

(75) Inventors: Chen-Yui Yang, Marlboro, NJ (US);
Paritosh Bajpay, Edison, NJ (US);
Anand Singh, Marlboro, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 215 days.

(21) Appl. No.: 11/960,335

(22) Filed: Dec. 19, 2007

(65) Prior Publication Data
US 2009/0161679 A1 Jun. 25, 2009

(51) Int. Cl.
*H04L 12/28* (2006.01)
(52) U.S. Cl. .................. 370/409; 370/231
(58) Field of Classification Search .............. None
See application file for complete search history.

(56) References Cited

U.S. PATENT DOCUMENTS

| | | | | |
|---|---|---|---|---|
| 6,662,221 | B1 * | 12/2003 | Gonda et al. | 709/223 |
| 7,080,161 | B2 * | 7/2006 | Leddy et al. | 709/250 |
| 7,450,505 | B2 * | 11/2008 | Buchanan et al. | 370/231 |
| 7,450,598 | B2 * | 11/2008 | Chen et al. | 370/409 |
| 2007/0226630 | A1 * | 9/2007 | Farid et al. | 715/734 |
| 2008/0232379 | A1 * | 9/2008 | Mohamed et al. | 370/395.53 |

* cited by examiner

*Primary Examiner*—Robert W Wilson

(57) ABSTRACT

In one embodiment, the present invention is a method and apparatus for customer-controlled routing management. In one embodiment, a system for managing routing in a virtual private network includes a configuration management system for receiving settings from a user of the virtual private network, the settings specifying at least one of: virtual private network topology and routing preferences, and for provisioning the virtual private network in accordance with the user settings and a validation management system for validating the provisioned virtual private network.

17 Claims, 6 Drawing Sheets

METHOD AND APPARATUS FOR CUSTOMER-CONTROLLED ROUTING MANAGEMENT

FIELD OF THE INVENTION

The present invention relates generally to virtual private networks (VPNs) and relates more particularly to VPN routing management.

SUMMARY OF THE INVENTION

In one embodiment, the present invention is a method and apparatus for customer-controlled routing management. In one embodiment, a system for managing routing in a virtual private network includes a configuration management system for receiving settings from a user of the virtual private network, the settings specifying at least one of: virtual private network topology and routing preferences, and for provisioning the virtual private network in accordance with the user settings and a validation management system for validating the provisioned virtual private network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention is method and apparatus for customer-controlled routing management. Embodiments of the invention provide VPN users (customers) with the capability to control their network routing (e.g., based on delay, traffic, security policies, etc.). Embodiments of the invention allow the user to perform configuration management, VPN topology database management, testing management, performance, and planning management in substantially real time.

For instance, the present invention may allow a user to re-provision a VPN configured as an any-to-any type (i.e., in which all devices in the VPN can communicate directly) as hub and spoke type VPN (i.e., in which hub devices can communicate directly with hubs and spokes, but spoke devices can only communicate directly with hubs).

Figure 1:
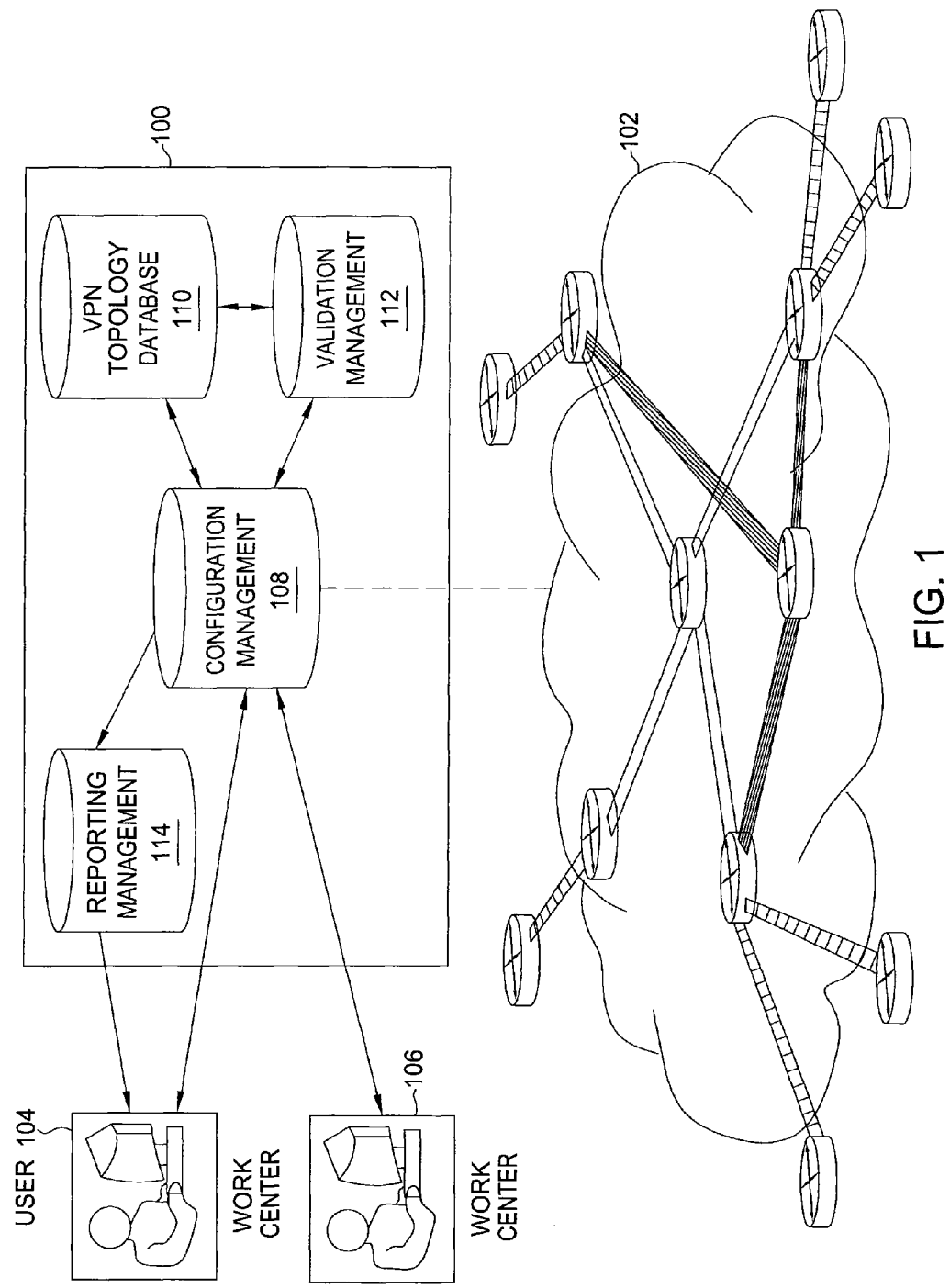
FIG. 1 is a schematic diagram illustrating one embodiment of a routing management system, according to the present invention.

FIG. 1 is a schematic diagram illustrating one embodiment of a routing management system 100, according to the present invention. As illustrated, the system 100 is configured to allow a user (e.g., VPN customer) 104 to manage routing in a VPN 102. The system 100 is also accessible by a work center 106, which may be associated with a provider of VPN services.

In one embodiment, the VPN 102 is a multiprotocol label switching (MPLS) VPN comprising a plurality of routers, including provider edge routers and customer edge routers.

The system 100 has a modular architecture comprising a plurality of subfunctional systems. In one embodiment, these subfunctional systems comprise: a configuration management system 108, a VPN topology database 110, a validation management system 112, and a reporting management system 114. In one embodiment, all of these subfunctional systems are accessible to the user 104 in substantially real time.

The configuration management system 108 is in communication with the VPN topology database 110, the validation management system 112, and the reporting management system 114, as well as with the user 104 and the work center 106. In one embodiment, the configuration management system 108 is a subfunctional system that provides the user 104 with the ability to create, view, and change routing policies, without assistance from the VPN service provider. In particular, the user 104 can access the configuration management system 108 to set the VPN type (e.g., hub and spoke) and the VPN site type (e.g., hub or spoke) for each VPN site in the VPN 102. For hub and spoke-type VPNs, the configuration management system 108 further allows the user to configure specific routing group data or routing requirements within a community of interest, and discussed in greater detail below.

Figure 3:
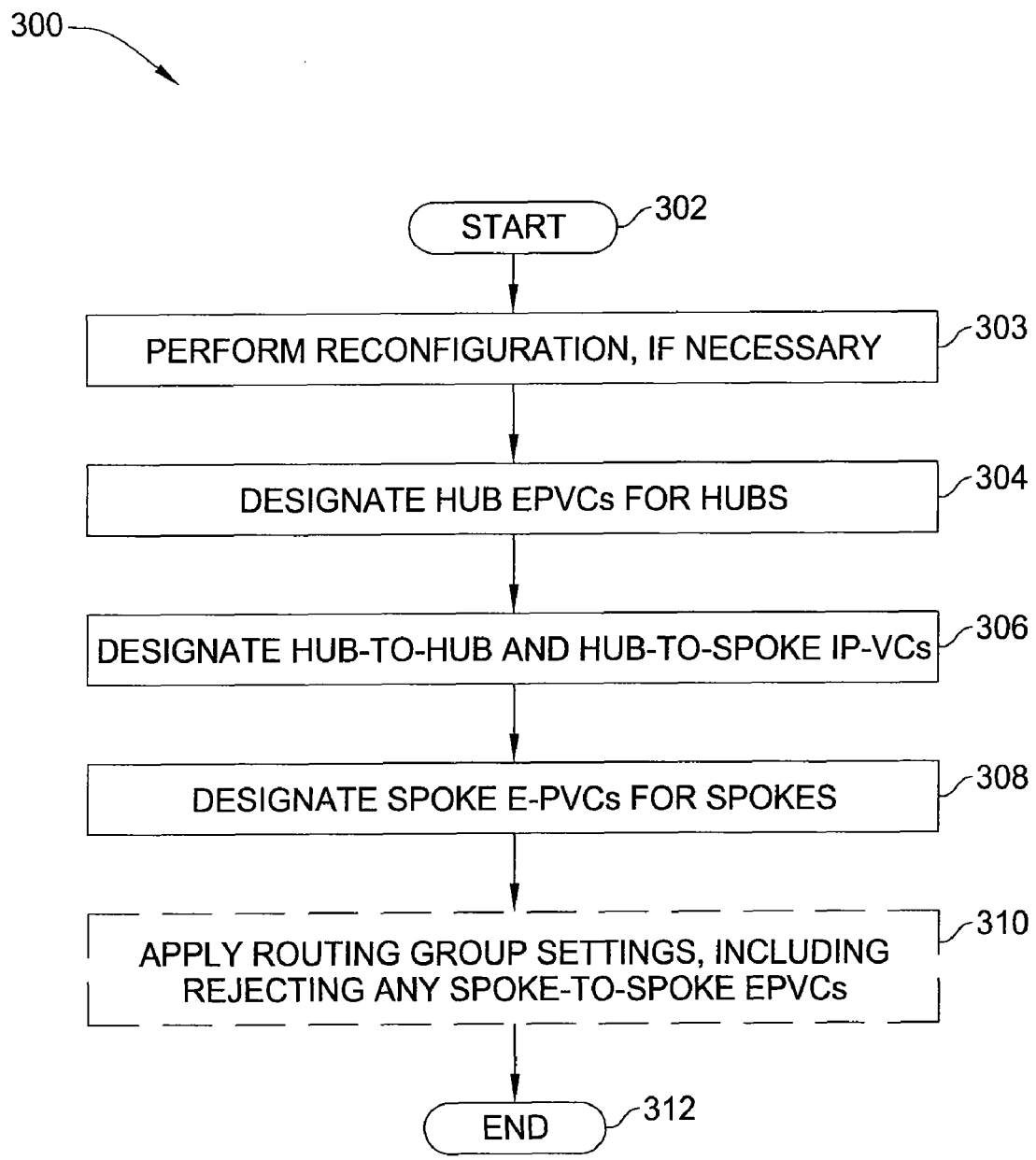
FIG. 3 is a flow diagram illustrating one embodiment of a method for provisioning a VPN based on user settings, according to the present invention.

In one embodiment, the configuration management system 108 runs an automated network provisioning algorithm, one embodiment of which is discussed in greater detail with respect to FIG. 3, that allows the user 104 to control routing by configuring routing groups that apply common routing policies (e.g., route selection and rejection) to VPN sites associated therewith. For instance, a user 104 with two Internet gateways can use the routing group feature provided by the network provisioning algorithm to direct which VPN sites use which Internet gateway (e.g., by setting up two routing groups and associating each VPN site with one of the routing groups).

In one embodiment, the configuration management system 108 further allows the user 104 to assign range privileges for individual VPN sites, so that hubs can communicate directly with other hubs and with spokes, and so that spokes can communicate directly with hubs, but not with other spokes. In a further embodiment, the configuration management system 108 is further configured to notify the work center 106 when failure occurs in the provisioning/configuration of the VPN 102.

The VPN topology database 110 is in communication with the configuration management system 108 and the validation management system 112. The VPN topology database 110 stores VPN topology data (e.g., hub and spoke designations for VPN sites) and routing group data. In addition, the VPN topology database supports the configuration management system 108 and the validation management system 112 by making the VPN topology data and the routing group data accessible to these systems. The VPN topology database 110 is also accessible to the user 104 for management and maintenance.

The validation management system 112 is in communication with the configuration management system 108 and the VPN topology database 110. The validation management system 112 automatically executes all planned test activities (e.g., for quality and performance measurements) in the VPN 102, and monitors all permanent virtual channels (PVCs) to determine when there are problems. The validation management system 112 sends test results to the reporting management system 114 (e.g., via the configuration management system 108). The validation management system 112 is accessible to the user 104 (e.g., via the configuration management system 108) for the scheduling of tests.

The reporting management system 114 is in communication with the configuration management system 108, as well as with the user 104 and the work center 106. The reporting management system 114 provides status information (e.g., succeed or fail) following provisioning/configuration attempts. In further embodiments, the reporting management system 114 generates reports on VPN performance, trouble detection, and/or traffic measurement. Data for generating these reports may be derived (via the configuration management system 108) from the validation management system 112.

Figure 2:
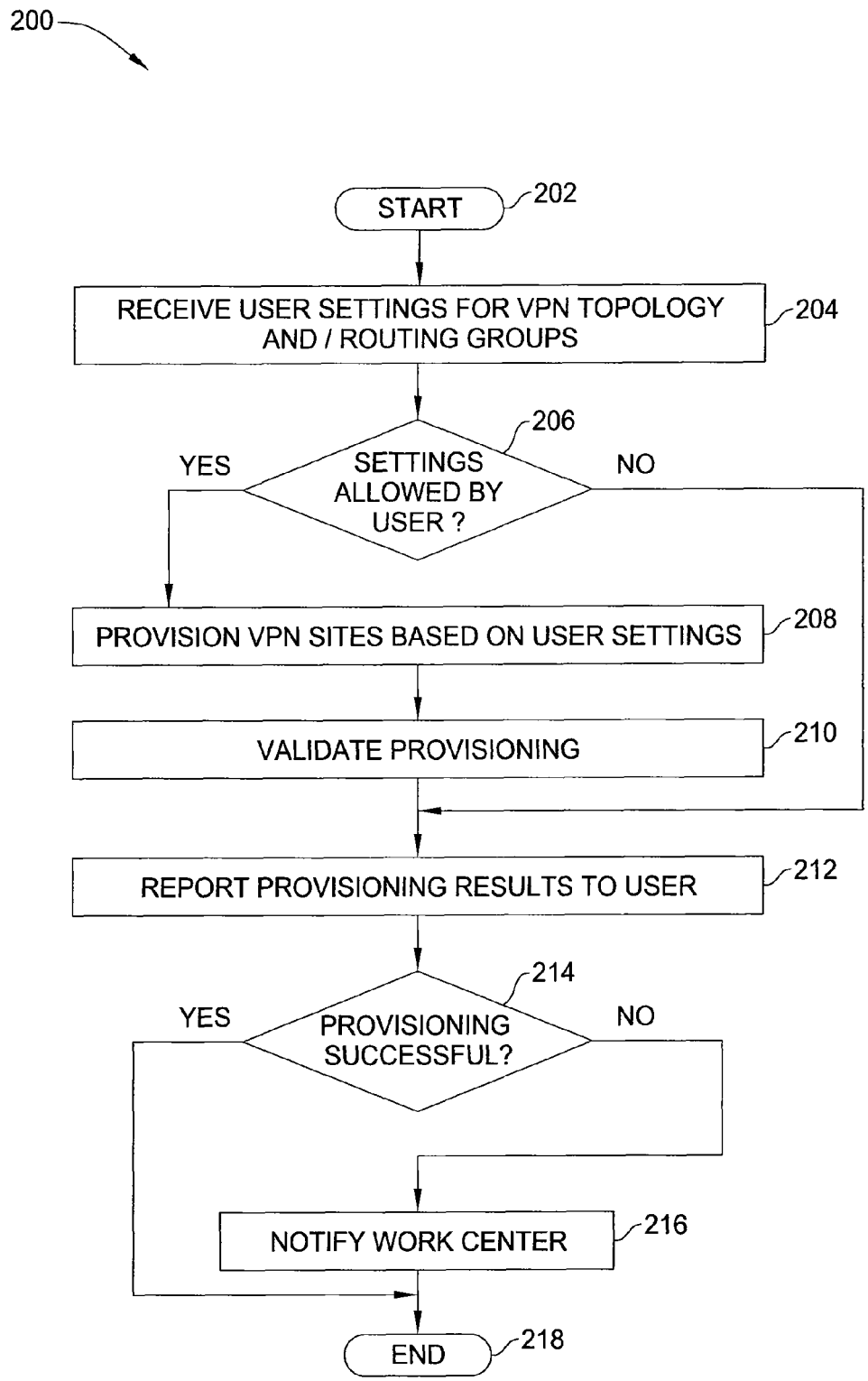
FIG. 2 is a flow diagram illustrating one embodiment of a method for routing management, according to the present invention.

FIG. 2 is a flow diagram illustrating one embodiment of a method 200 for routing management, according to the present invention. The method 200 may be implemented, for example, by the routing management system 100 illustrated in FIG. 1.

The method 200 is initialized at step 202 and proceeds to step 204, where the configuration management system receives user settings for the VPN topology. In one embodiment, the settings are received directly from the user and specify the type (e.g., hub and spoke) of the VPN to be provisioned and the type (e.g., hub or spoke) of each VPN site in the VPN to be provisioned. In another embodiment, the user settings specify routing group data for special routing requirements that the user wishes to implement within a community of interest.

In step 206, the configuration management system verifies (e.g., by checking a service contract) that the user is allowed to configure the VPN with the topology requested. If the configuration management system concludes in step 206 that the user is allowed to configure the VPN with the topology requested, the method 200 proceeds to step 208, where the configuration management system provisions the VPN based on the user settings received in step 204. In one embodiment, the configuration management system provisions the VPN using an automated network provisioning algorithm, one embodiment of which is discussed in greater detail with respect to FIG. 3. In one embodiment (e.g., where provisioning involves converting an any-to-any type VPN to a hub and spoke type VPN), the configuration management system may be required to change circuit orders to provision the VPN as requested.

Once the configuration management system has provisioned the VPN, the method 200 proceeds to step 210, where the validation management system validates the provisioning. In one embodiment, validation involves performing all planned testing activities in the provisioned VPN.

In step 212, the reporting management system reports the results of the provisioning to the user. In one embodiment, the reports are based on the results of the validation (i.e., the tests performed by the validation management system) performed in step 210. In one embodiment, the reports include data relating to one or more of the following: VPN/provisioning status, VPN performance, trouble detection, and traffic measurement.

Referring briefly back to step 206, if the configuration management system concludes that the user is not allowed to configure the VPN with the topology requested, the method 200 skips directly to step 212, where the reporting management system reports this conclusion to the user.

In step 214, the configuration management system determines whether the provisioning requested in step 204 and implemented in step 208 was successful, based on the reports generated in step 212. If the configuration management system concludes in step 214 that the provisioning failed, the configuration management system notifies the work center in step 216, so that work center personnel may address the failure. The method 200 then terminates in step 218.

Alternatively, if the configuration management system concludes in step 214 that the provisioning failed, the method 200 skips directly to step 218 and terminates.

FIG. 3 is a flow diagram illustrating one embodiment of a method 300 for provisioning a VPN based on user settings (e.g., in accordance with step 208 of the method 200), according to the present invention. The method 300 may be implemented, for example, by a configuration management system that executes an automated network provisioning algorithm.

The method 300 is initialized at step 302 and proceeds to step 303, where the method 300 performs a reconfiguration of the VPN, if necessary. For example, reconfiguration may be necessary to convert an any-to-any VPN to a hub and spoke VPN.

In step 304 the configuration management system designates hub enterprise private virtual channels (E-PVCs) for VPN sites that are designated as hubs by the user settings.

In step 306, the configuration management system designates the Internet Protocol virtual channels (IP-VCs) for the hubs designated in step 304. The IP-VCs provide hub-to-hub and hub-to-spoke channels. Thus, in one embodiment, designation of an IP-VC involves setting the VPN site type of a first end of the IP-VC to "hub" and the VPN site type of a second end of the IP-VC to "spoke". At least the first end of the IP-VC is coupled to an associated hub.

In step 308, the configuration management system designates spoke E-PVCs for VPN sites that are designated as spokes by the user settings.

In step 310, the configuration management system applies routing group settings to any VPN sites that are indicated by the user settings as being subscribed to a routing group. In one embodiment, each routing group has two sets of control mechanisms with predefined border gateway protocol (BGP) CVs: (1) preference; and (2) denial. Preference controls allow for deterministic route selection, while denial controls disallow address reachability. In one embodiment, the preference controls specify a predefined plurality of preference levels, which allows the user to prioritize routes in order of route selection. The order of route selection is based on predefined CVs. In one embodiment, the denial controls allow for the rejection of only one route, also based on a predefined CV. Thus, for example, a five-level preference policy for defining an order of route selection in accordance with predefined CVs might look like the following:

CV1→preference 1 (i.e., most preferred)
CV2→preference 2
CV3→preference 3
CV4→preference 4
CV5→preference 5
CV6→reject this route In one embodiment, the configuration management system allows routing groups for BGP routes only.

In one embodiment, step 310 includes rejecting any user settings that would require a spoke-to-spoke E-PVC (as spokes cannot communicate directly with other spokes). Thus, the configuration management system associates each VPN site that is designated as part of a routing group with the appropriate routing group. In one embodiment, a user is permitted to configure a predefined maximum number of routing groups for a single VPN.

In further embodiments, the configuration management system may also add or delete sites to existing hub and spoke VPN topology, add or delete routing groups associated with particular VPN sites, or change the type of a VPN site (e.g., from hub to spoke or from spoke to hub).

In further embodiments still, the configuration management system employs an algorithm that provides for the conversion of a hub and spoke VPN to an any-to-any VPN. Moreover, the configuration management system may apply routing group settings to any-to-any VPNs.

In one embodiment, routing groups are deployed in accordance with VPN routing and forwarding (VRF) tables that are unique to each routing group and specify the common routing policies for the associated routing group. In one embodiment the VRF tables specify predefined routing and rejection policies for their respective routing groups, as discussed above.

Figure 4A:
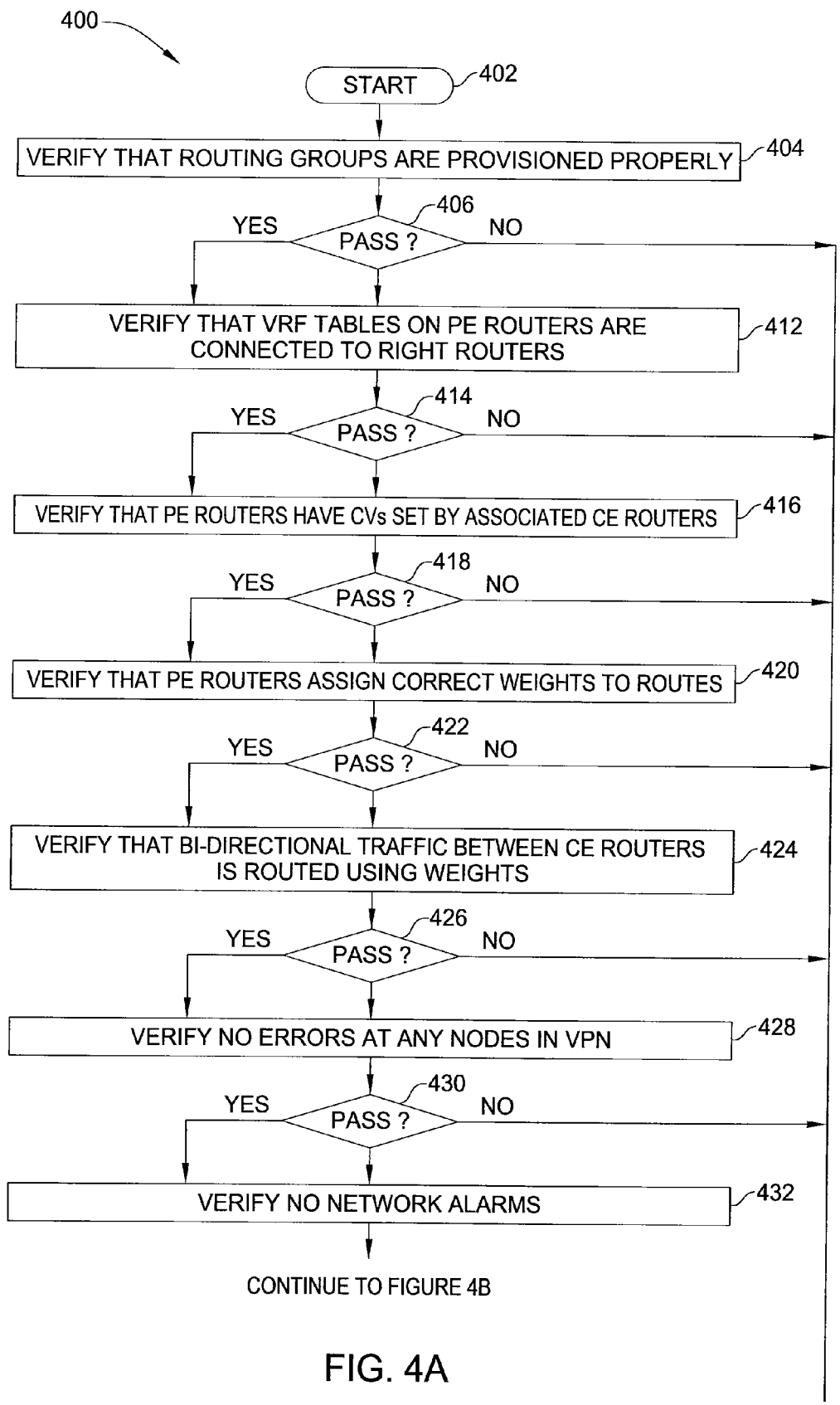
FIG. 4 is a flow diagram illustrating one embodiment of a method 400 for validating a provisioned VPN.
Figure 4B:
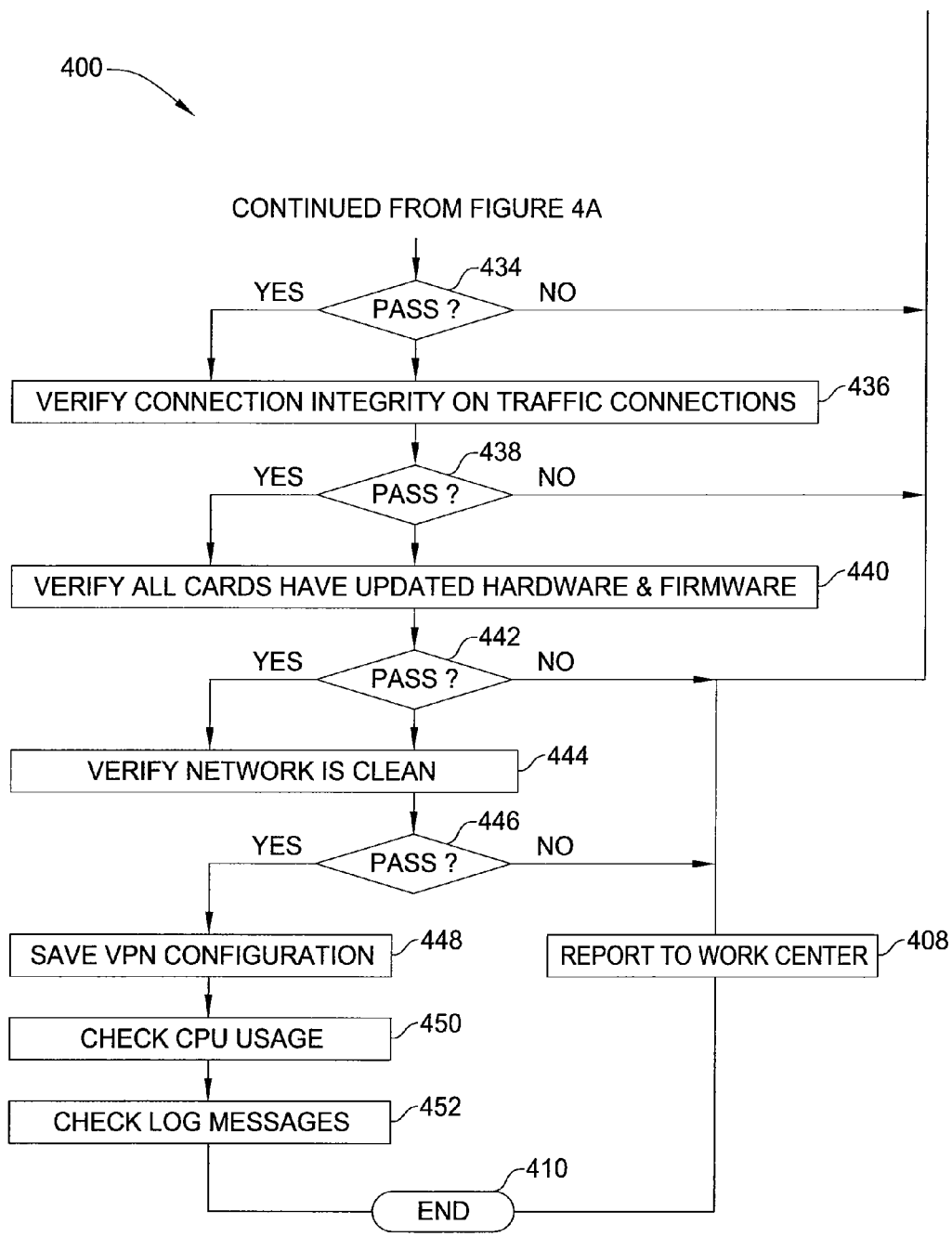

FIG. 4 is a flow diagram illustrating one embodiment of a method 400 for validating a provisioned VPN. The method 400 may be implemented, for example, in accordance with step 210 of the method 200. In one embodiment, validation of VPN provisioning involves one or more of a plurality of tests to confirm that the VPN is functional as provisioned.

The method 400 is initialized at step 402 and proceeds to step 404, where the validation management system verifies that routing groups are provisioned as per the user settings. In step 406, the validation management system determines whether the provisioned VPN passes this criterion. If the validation management system concludes in step 406 that the routing groups are not provisioned in accordance with the user settings, the validation management system alerts the work center (e.g., via a reporting management system) in step 408 before terminating in step 410.

Alternatively, if the validation management system concludes in step 406 that the routing groups are provisioned in accordance with the user settings, the method 400 proceeds to step 412, where the validation management system verifies that VRF tables on provider edge routers are connected to the right routers. In step 414, the validation management system determines whether the provisioned VPN passes this criterion. If the validation management system concludes in step 414 that the VRF tables on provider edge routers are not connected to the right routers, the validation management system alerts the work center (e.g., via a reporting management system) in step 408 before terminating in step 410.

Alternatively, if the validation management system concludes in step 414 that the VRF tables on provider edge routers are connected to the right routers, the method 400 proceeds to step 416, where the validation management system verifies that the provider edge routers have CVs as set by associated customer edge routers. In step 418, the validation management system determines whether the provisioned VPN passes this criterion. If the validation management system concludes in step 418 that the provider edge routers do not have CVs as set by associated customer edge routers, the validation management system alerts the work center (e.g., via a reporting management system) in step 408 before terminating in step 410.

Alternatively, if the validation management system concludes in step 418 that the provider edge routers do have CVs as set by associated customer edge routers, the method 400 proceeds to step 420, where the validation management system verifies that the provider edge routers assign the correct weights to each route in the routing groups. In step 422, the validation management system determines whether the provisioned VPN passes this criterion. If the validation management system concludes in step 422 that the provider edge routers do not assign the correct weights to each route in the routing groups, the validation management system alerts the work center (e.g., via a reporting management system) in step 408 before terminating in step 410.

Alternatively, if the validation management system concludes in step 422 that the provider edge routers do assign the correct weights to each route in the routing groups, the method 400 proceeds to step 424, where the validation management system verifies that bidirectional traffic between customer edge routers is routed in accordance with the weights assigned to the routes in the VRF tables (customer edge routers should be able to ping each hub, but no other spokes). In step 426, the validation management system determines whether the provisioned VPN passes this criterion. If the validation management system concludes in step 426 that the bidirectional traffic between customer edge routers is not routed in accordance with the weights assigned to the routes in the VRF tables, the validation management system alerts the work center (e.g., via a reporting management system) in step 408 before terminating in step 410.

Alternatively, if the validation management system concludes in step 426 that the provider edge routers do assign the correct weights to each route in the routing groups, the method 400 proceeds to step 428, where the validation management system verifies that there are no errors on any nodes in the VPN. In step 430, the validation management system determines whether the provisioned VPN passes this criterion. If the validation management system concludes in step 430 that there are errors on one or more nodes in the VPN, the validation management system alerts the work center (e.g., via a reporting management system) in step 408 before terminating in step 410.

Alternatively, if the validation management system concludes in step 430 that there are no errors on any nodes in the VPN, the method 400 proceeds to step 432, where the validation management system verifies that there are no network alarms. In step 434, the validation management system determines whether the provisioned VPN passes this criterion. If the validation management system concludes in step 434 that there are one or more network alarms, the validation management system alerts the work center (e.g., via a reporting management system) in step 408 before terminating in step 410.

Alternatively, if the validation management system concludes in step 434 that there are one or more network alarms, the method 400 proceeds to step 436, where the validation management system verifies the connection integrity on connections set up for traffic. In step 438, the validation management system determines whether the provisioned VPN passes this criterion. If the validation management system concludes in step 438 that the connection integrity on connections set up for traffic cannot be verified, the validation management system alerts the work center (e.g., via a reporting management system) in step 408 before terminating in step 410.

Alternatively, if the validation management system concludes in step 438 that the connection integrity on connections set up for traffic can be verified, the method 400 proceeds to step 440, where the validation management system verifies that all cards in the VPN are updated with the most current hardware and firmware. In step 442, the validation management system determines whether the provisioned VPN passes this criterion. If the validation management system concludes in step 442 that all cards in the VPN are not updated with the most current hardware and firmware, the validation management system alerts the work center (e.g., via a reporting management system) in step 408 before terminating in step 410.

Alternatively, if the validation management system concludes in step 442 that all cards in the VPN are updated with the most current hardware and firmware, the method 400 proceeds to step 444, where the validation management system verifies that the network is clean (e.g., no bindwaits). In step 446, the validation management system determines whether the provisioned VPN passes this criterion. If the validation management system concludes in step 446 that that the network is not clean, the validation management system alerts the work center (e.g., via a reporting management system) in step 408 before terminating in step 410.

Alternatively, if the validation management system concludes in step 446 that the network is clean, the method 400 proceeds to step 448, where the validation management system saves the VPN configuration to facilitate restoration of the VPN in the event of failure. In one embodiment, the validation management system saves the VPN configuration on a periodic basis.

The method 400 then proceeds to step 450, where the validation management system checks processor usage in order to identify unexpected spikes in usage levels during testing. Finally, the validation management system checks log messages in step 452 for traps and other errors messages, and, if appropriate, create reports (e.g., for the user and/or work center). The method 400 then terminates in step 410.

Figure 5:
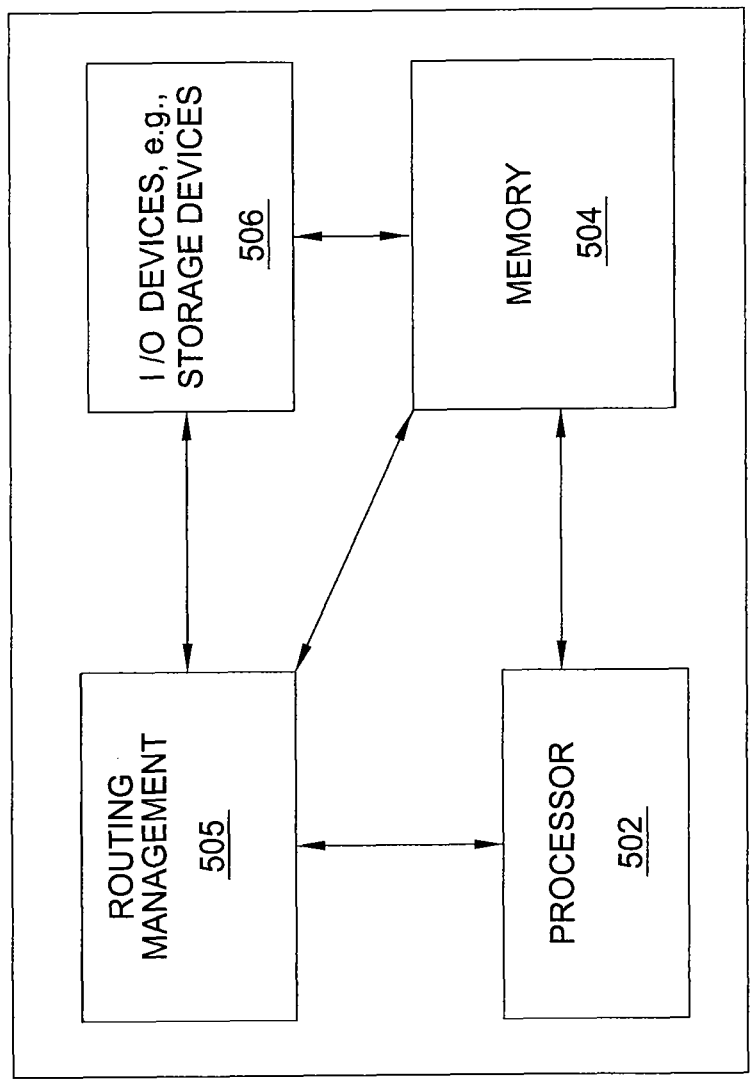
FIG. 5 is a high level block diagram of the routing management method that is implemented using a general purpose computing device.

FIG. 5 is a high level block diagram of the routing management method that is implemented using a general purpose computing device 500. In one embodiment, a general purpose computing device 500 comprises a processor 502, a memory 504, a routing management module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the routing management module 505 can be implemented as a physical device or subsystem that is coupled to a processor through a communication channel.

Alternatively, the routing management module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the routing management module 505 for VPN routing management described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing routing in a virtual private network, comprising:
    receiving user settings from a user of the virtual private network, the user settings specifying at least one of: virtual private network topology and routing preferences, wherein the user settings provide for a conversion of an any-to-any topology to a hub and spoke topology;
    provisioning the virtual private network in accordance with the user settings, wherein the provisioning comprises:
        designating at least one hub private virtual channel for a first site designated as a hub by the user settings;
        designating at least one Internet Protocol virtual channel for the first site, after designating the at least one hub private virtual channel, where a first end of the at least one Internet Protocol virtual channel has a virtual private network site type set to "hub" and is coupled to the first site and a second end of the at least one Internet Protocol virtual channel has a virtual private network site type set to "spoke" and is coupled to a second site designated as a spoke by the user settings; and
        designating at least one spoke private virtual channel for the second site, after designating the at least one Internet Protocol virtual channel; and
    validating the virtual private network after the provisioning wherein at least one of: the receiving, the provisioning, or the validating is performed by a processor.

2. The method of claim 1, wherein the user settings provide for a creation of at least one routing group, the at least one routing group comprising one or more virtual private network sites that share common routing preferences.

3. The method of claim 2, wherein the provisioning further comprises:
    associating a virtual private network routing and forwarding table with each of the at least one routing group.

4. The method of claim 3, wherein each virtual private network routing and forwarding table comprises:
    one or more preferred routes, prioritized in order of preference; and
    one rejected route.

5. The method of claim 4, wherein the one or more preferred routes and the one rejected route are defined in accordance with border gateway protocol community values.

6. The method of claim 1, wherein the validating comprises testing to confirm at least one of: that routing groups are provisioned in accordance with the user settings, that virtual private network routing and forwarding tables on provider edge routers are connected to appropriate routers, that the provider edge routers have community values as set by associated customer edge routers, that the provider edge routers assign correct weights to each route in the routing groups, that bidirectional traffic between customer edge routers is routed in accordance with weights assigned to each route in the virtual private network routing and forwarding tables, that there are no errors on any nodes in the virtual private network, that there are no network alarms, that connection integrity on connections set up for traffic is verified, that all cards in the virtual private network are updated with current hardware and firmware, and that the virtual private network is clean.

7. The method of claim 1, further comprising:
    reporting results of the provisioning to the user.

8. The method of claim 1, further comprising:
- detecting a problem with the provisioning during the validating; and
- reporting the problem to a service provider work center.

9. A non-transitory computer readable storage medium containing an executable program for managing routing in a virtual private network, where the program performs steps of:
- receiving user settings from a user of the virtual private network, the settings specifying at least one of: virtual private network topology and routing preferences, wherein the user settings provide for a conversion of an any-to-any topology to a hub and spoke topology;
- provisioning the virtual private network in accordance with the user settings, wherein the provisioning comprises:
  - designating at least one hub private virtual channel for a first site designated as a hub by the user settings;
  - designating at least one Internet Protocol virtual channel for the first site, after designating the at least one hub private virtual channel, where a first end of the at least one Internet Protocol virtual channel has a virtual private network site type set to "hub" and is coupled to the first site and a second end of the at least one Internet Protocol virtual channel has a virtual private network site type set to "spoke" and is coupled to a second site designated as a spoke by the user settings; and
  - designating at least one spoke private virtual channel for the second site, after designating the at least one Internet Protocol virtual channel; and
- validating the virtual private network after the provisioning.

10. A system for managing routing in a virtual private network, comprising:
- a processor configured as a configuration management system for receiving user settings from a user of the virtual private network, the user settings specifying at least one of: virtual private network topology and routing preferences, and for provisioning the virtual private network in accordance with the user settings; and
- a validation management system for validating the virtual private network after provisioning by the configuration management system, wherein the configuration management system provisions the virtual private network by:
- designating at least one hub private virtual channel for a first site designated as a hub by the user settings;
- designating at least one Internet Protocol virtual channel for the first site, after designating the at least one hub private virtual channel, where a first end of the at least one Internet Protocol virtual channel has a virtual private network site type set to "hub" and is coupled to the first site and a second end of the at least one Internet Protocol virtual channel has a virtual private network site type set to "spoke" and is coupled to a second site designated as a spoke by the user settings; and
- designating at least one spoke private virtual channel for the second site, after designating the at least one Internet Protocol virtual channel.

11. The system of claim 10, wherein the configuration management system further provisions the virtual private network by:
- associating a virtual private network routing and forwarding table with each of one or more routing groups designed by the user settings, each of the one or more routing groups comprising one or more virtual private network sites that share common routing preferences.

12. The system of claim 11, wherein each virtual private network routing and forwarding table comprises:
- one or more preferred routes, prioritized in order of preference; and
- one rejected route.

13. The system of claim 12, wherein the one or more preferred routes and the one rejected route are defined in accordance with border gateway protocol community values.

14. The system of claim 10, wherein the validation management system is configured to run tests to confirm at least one of: that routing groups are provisioned in accordance with the user settings, that virtual private network routing and forwarding tables on provider edge routers are connected to appropriate routers, that the provider edge routers have community values as set by associated customer edge routers, that the provider edge routers assign correct weights to each route in the routing groups, that bidirectional traffic between customer edge routers is routed in accordance with weights assigned to routes in the virtual private network routing and forwarding tables, that there are no errors on any nodes in the virtual private network, that there are no network alarms, that connection integrity on connections set up for traffic is verified, that all cards in the virtual private network are updated with current hardware and firmware, and that the virtual private network is clean.

15. The system of claim 10, further comprising:
- a reporting management system for reporting results of the provisioning to the user.

16. The system of claim 10, further comprising:
- a reporting management system for reporting one or more problems detected by the validation management system to a service provider work center.

17. The system of claim 10, further comprising:
- a virtual private network topology database for storing topology data for the virtual private network.

* * * * *